(12) United States Patent
Lang et al.

(10) Patent No.: US 6,995,687 B2
(45) Date of Patent: Feb. 7, 2006

(54) PARKING AID FOR USE IN A MOTOR VEHICLE

(75) Inventors: Heinrich Lang, Ergersheim (DE); Michael Witzke, Ansbach (DE); Harald Emmert, Bad Windsheim (DE); Uwe Heller, Bad Windsheim (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 433 days.

(21) Appl. No.: 10/147,383

(22) Filed: May 16, 2002

(65) Prior Publication Data

US 2003/0025596 A1 Feb. 6, 2003

(30) Foreign Application Priority Data

Jun. 22, 2001 (DE) .......................... 201 10 339 U

(51) Int. Cl.
*G08G 1/00* (2006.01)

(52) U.S. Cl. .................. 340/932.2; 340/431; 340/435; 340/436; 348/148

(58) Field of Classification Search ............. 340/932.2, 340/425.5, 431, 434, 435, 436, 539.1; 348/148
See application file for complete search history.

(56) References Cited

U.S. PATENT DOCUMENTS

| | | | |
|---|---|---|---|
| 3,476,464 A | 11/1969 | Clark | |
| 3,574,283 A | 4/1971 | Albers | |
| 3,662,328 A | 5/1972 | Spivak | |
| 3,969,952 A | 7/1976 | McKee et al. | |
| 4,167,113 A | 9/1979 | Mann | |
| 4,210,357 A | 7/1980 | Adachi | |
| 4,267,494 A | 5/1981 | Matsuoka et al. | |
| 4,293,947 A | 10/1981 | Brittain | |
| 4,625,210 A | 11/1986 | Sagl | |
| 4,882,565 A | 11/1989 | Gallmeyer | |
| 4,907,222 A | 3/1990 | Slavik | |
| 4,940,964 A | 7/1990 | Dao | |
| 4,942,571 A | 7/1990 | Möller et al. | |
| 5,005,009 A | 4/1991 | Roberts | |
| 5,056,905 A | 10/1991 | Jensen | |
| 5,126,885 A | 6/1992 | Gray | |
| 5,128,659 A | 7/1992 | Roberts et al. | |
| 5,132,851 A | 7/1992 | Bomar et al. | |
| H1109 H | 10/1992 | Roberts et al. | |
| 5,212,467 A | 5/1993 | Park | |
| 5,249,083 A | 9/1993 | Doughtie et al. | |
| 5,253,115 A | 10/1993 | Ueno | |
| 5,289,321 A | 2/1994 | Secor | |
| 5,306,953 A | 4/1994 | Weiner | |
| 5,325,096 A | 6/1994 | Pakett | |
| 5,339,075 A | 8/1994 | Abst et al. | |
| 5,455,625 A | 10/1995 | Englander | |

(Continued)

FOREIGN PATENT DOCUMENTS

DE 19921449 C1 1/2001

(Continued)

*Primary Examiner*—Julie Lieu
(74) *Attorney, Agent, or Firm*—McNair Law Firm, P.A.

(57) ABSTRACT

A maneuvering aid for a vehicle is provided which has a detector and an information provider in wireless communication with each other. The detector and the information provider are synchronized upon the start of the vehicle, a reversing operation or the like to monitor the area about the vehicle and alert a driver of the vehicle of an obstacle near the vehicle. The detector is portable for use with multiple trailers that are attachable to the vehicle such that the information provider and detector remain in wireless communication.

44 Claims, 1 Drawing Sheet

U.S. PATENT DOCUMENTS

| | | | |
|---|---|---|---|
| 5,521,588 A | 5/1996 | Kühner et al. | |
| 5,523,811 A | 6/1996 | Wada et al. | |
| 5,574,443 A * | 11/1996 | Hsieh | 340/901 |
| 5,583,495 A | 12/1996 | Ben Lulu | |
| 5,587,699 A | 12/1996 | Faloon et al. | |
| 5,631,638 A * | 5/1997 | Kaspar et al. | 340/902 |
| 5,642,106 A | 6/1997 | Hancock et al. | |
| 5,677,979 A | 10/1997 | Squicciarini et al. | |
| 5,680,123 A | 10/1997 | Lee | |
| 5,684,337 A | 11/1997 | Wallace | |
| 5,696,776 A | 12/1997 | Spies et al. | |
| 5,744,875 A | 4/1998 | Kleefeldt et al. | |
| 5,754,100 A * | 5/1998 | Park | 340/435 |
| 5,963,127 A | 10/1999 | Lang et al. | |
| 5,978,017 A | 11/1999 | Tino | |
| 6,006,143 A | 12/1999 | Bartel et al. | |
| 6,163,338 A | 12/2000 | Johnson et al. | |
| 6,339,369 B1 * | 1/2002 | Paranjpe | 340/436 |

FOREIGN PATENT DOCUMENTS

| | | |
|---|---|---|
| EP | 0370965 A2 | 5/1990 |
| EP | 0591743 A1 | 4/1994 |

\* cited by examiner

PARKING AID FOR USE IN A MOTOR VEHICLE

FIELD OF THE INVENTION

The present invention concerns a parking aid for use in a motor vehicle and especially for application in a truck.

BACKGROUND OF THE INVENTION

In the state of the technology, a parking aid for motor vehicles is known, which possesses a detector that can be mounted on the rear of the motor vehicle and an information provider in or on a driver's cab. The detector, which can be a radar, imaging or other electromagnetic, electro-optic or sonic device, possesses a sensor and a control apparatus. Control signals can be transmitted from the information provider to the control apparatus for the regulation of the detector. Further, signals from the detector which advise of a situation behind the motor vehicle can be transmitted to the information provider to inform the driver about a situation behind the motor vehicle. If the detector is an image sensor, the information is available to the driver by a screen display or similar device. In the case of a radar apparatus, then the information or data is delivered to the driver by an acoustic warning emanating from the information provider.

In the foregoing arrangements, the driver is assisted during a backing up operation, for example, when parking in a manner to avoid running into an obstruction such as a parked motor vehicle or the like. Presently, the connection between the information provider and the detection equipment in such parking aids is implemented by electrical wiring. However, there are disadvantages in regard to expense and labor installation time, especially when the parking aid is to be installed in an existing vehicle. Additionally, if the parking aid is to be used on a truck with a pulled or saddled trailer, a releasable connection must be provided between the information provider on the truck and the detection device on the back of the truck or trailer assembly in order to uncouple the pulled or saddled trailer.

BRIEF SUMMARY OF THE INVENTION

The present invention provides a parking aid for use in a motor vehicle, which assures simple installation and a high degree of flexibility. The parking aid possesses a sensing device for the detection of a situation behind the motor vehicle and has an information provider, which is provided separate from the sensing device. The information provider informs a driver of the situation behind the motor vehicle by conveying a signal of a situation without wiring from the detector to the information provider.

Since the transmission of the signal of a situation behind the motor vehicle is carried out without wiring, no wiring is necessary between the information provider and the detector which would call for a rewiring of an existing motor vehicle. Accordingly, only the information provider and the detector must be installed in accordance with the present invention, which makes additional electrical lines unnecessary.

By way of example, if the inventive parking aid is used with a truck having a pulled or saddle carried trailer, no releasable connection between the truck and the pulled or saddle carried trailer need be made, which substantially simplifies an uncoupling or exchange of the pulled or saddle carried trailer.

In accord with an embodiment of the present invention, the information provider is placed in or on the driver's cab and the detector is installed on the rear of the motor vehicle assembly.

In accord with another embodiment of the present invention, the detector is removable from the rear of the motor vehicle assembly.

In accord with a further embodiment of the present invention, the detector is placed on a rear component of the motor vehicle, which can be uncoupled from the cab or engine portion of the motor vehicle.

In accord with yet another embodiment of the present invention, signals are transmitted without wiring from the information provider to the detector for the purpose of control and/or programming of the detector.

In accord with a further embodiment of the present invention, the control and/or the programming is carried out manually or automatically.

In accord with a further embodiment of the present invention the transmission between the information provider and the detector is carried out by radio.

In accord with a further embodiment of the present invention, the transmission between the information provider and the detector is provided in analog or digital format.

In accord with a further embodiment of the present invention, the transmission between the information provider and the detector is carried out by standard Digital Enhanced Cordless Telecommunications (hereinafter DECT) or Bluetooth™ short wave technology.

In accord with a further embodiment of the present invention, the detector possesses a sensor apparatus and a control apparatus.

In accord with a further embodiment of the present invention, the detector possesses an image sensor, a radar apparatus, an ultrasonic sensor apparatus and/or an infrared sensor apparatus or like sensors for the detection of objects in a vicinity of the vehicle.

In accord with a further embodiment of the present invention, the information provider possesses a screen display apparatus, an acoustic warning device, and/or a visual warning apparatus.

In accord with a further embodiment of the present invention, the display apparatus is integrated in a rearview mirror or is attached thereto.

In accord with a further embodiment of the present invention, a certain association between the information provider and the detector is assured via a recognition signal denoting that both apparatuses are simultaneously available.

In accord with a further embodiment of the present invention, the recognition signal is a backup signal.

In accord with a further embodiment of the present invention, the backup signal is made available after a shifting to a reverse gear and is transmitted to the detector by a backup light of the motor vehicle.

In accord with a further embodiment of the present invention, the recognition signal is a signal of the initiation of the ignition of the motor vehicle.

In accord with a further embodiment of the present invention, the signal which announces the initiation of the ignition of the motor vehicle becomes available after a switching on of the ignition of the motor vehicle and is transmitted to the detector from a component, which is supplied with energy after the initiation of the ignition of the motor vehicle.

BRIEF DESCRIPTION OF THE DRAWING

The foregoing aspects and advantages of the present invention will be more closely described and explained with the aid of the attendant drawing, which shows a parking aid placed on a motor vehicle in accord with an exemplary embodiment of the present invention.

DETAILED DESCRIPTION OF THE INVENTION

Figure 1:
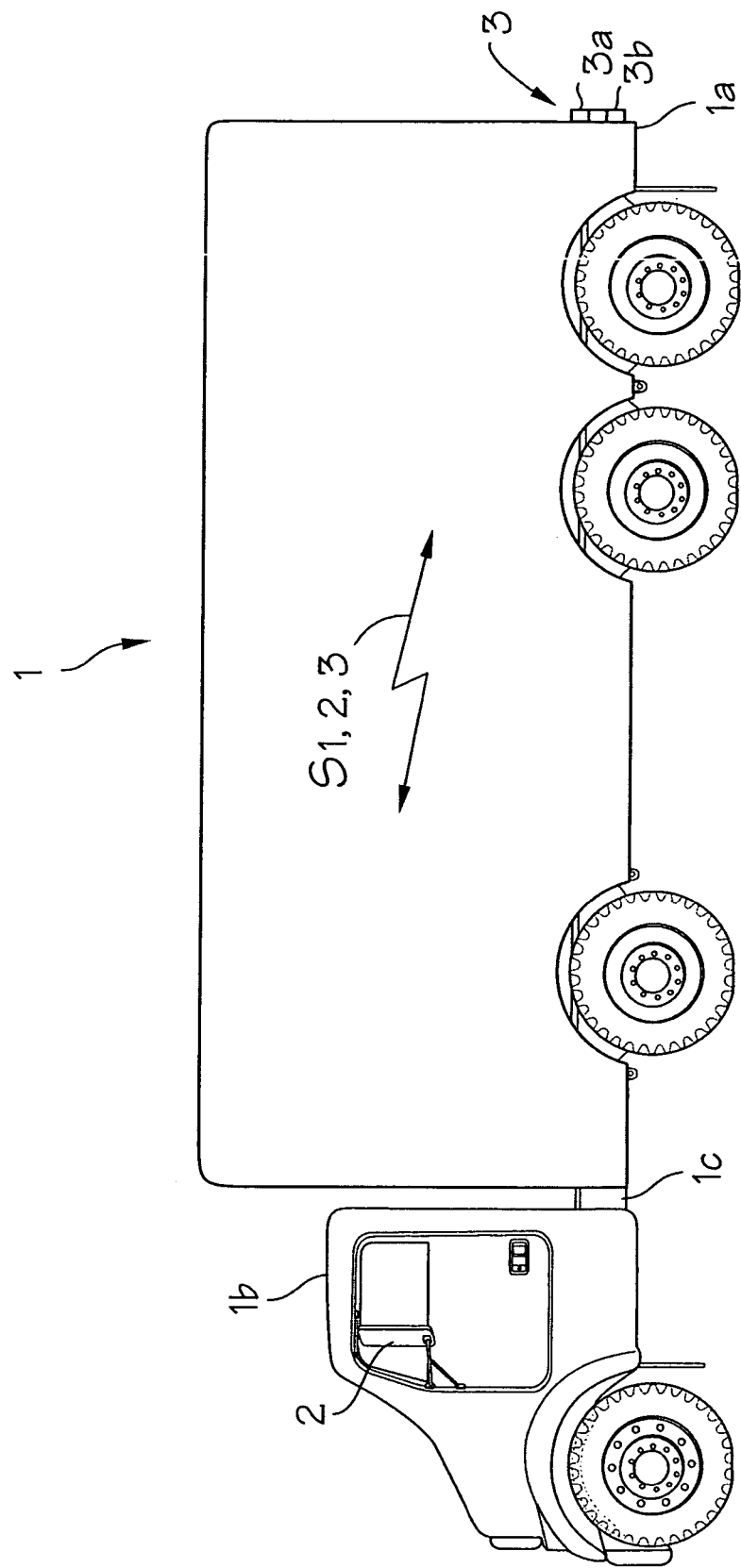

Detailed reference will now be made to the drawing in which an example embodying the present invention is shown. The drawing and detailed description provide a full and detailed written description of the invention, and of the manner and process of making and using it, so as to enable one skilled in the pertinent art to make and use it, as well as the best mode of carrying out the invention. However, the examples set forth in the drawing and detailed description are provided by way of explanation only and are not meant as limitations of the invention. The present invention thus includes any modifications and variations of the following examples as come within the scope of the appended claims and their equivalents.

It is to be noted that although the figure symbolizes a tractor trailer, the parking aids can be installed on other motor vehicles, such as a passenger car, a freight truck, or a truck pulling a trailer. Accordingly, the concepts in the following description are not limited to use solely on the tractor trailer as shown.

Referring to the figure, the reference number 1 denotes a motor vehicle, the number 2 designates an information provider, and the reference number 3 denotes a detector.

The detector 3 serves the purpose of discerning a situation behind the motor vehicle 1. By way of example, detector 3 is placed on a rear 1a of the motor vehicle 1. The information provider 2 is in or on a driver cab 1b of the motor vehicle 1 and thus placed separately from the detector 3.

In an aspect of the invention, the motor vehicle 1 is comprised of a separate pulling vehicle 1b and the separate rear part 1a, which can be uncoupled from the pulling vehicle 1b via a coupling mechanism 1c. In other words, separable vehicle 1 may be a tractor trailer in which the detector 3 is placed on the back 1a of the trailer, which can be uncoupled from the pulling vehicle 1b.

The information provider 2 alerts the driver to the situation behind the motor vehicle 1 based on data provided by the detector 3. The data is displayed at the time when a signal $S_1$ denoting the situation in the rear 1a of the vehicle 1 is transmitted from the detector 3 to the information provider 2. The information provider 2 possesses, for instance, a screen display apparatus, an acoustic warning, and/or a visual alarm device such as an LED. The display apparatus, for example, is integrated into a rearview mirror (not shown) of the motor vehicle 1 or attached thereto.

The detector 3 has a sensor apparatus 3a and a control apparatus 3b. The sensor apparatus 3a may be, for instance, an image sensor, i.e. a video camera, a radar installation, a ultrasonic sensor apparatus, and/or an infrared beam arrangement. The control apparatus 3b is attached to the sensor apparatus 3a.

In one aspect of the invention, the video camera 3a transmits its non-wired image signals $S_1$ to the screen at the information provider 2. The signals $S_1$ depicting the situation behind the motor vehicle 1 are displayed on the screen. In this way, the driver sees the situation behind the motor vehicle 1 on the screen and can thereby avoid an accident in the course of backing up, for instance, by accidently backing vehicle 1 into a parked motor vehicle (not shown) or the like.

Detector 3, which as noted may be a radar sensor apparatus, an ultrasonic sensor device, and/or an infrared apparatus, is provided to scan a specific area behind the motor vehicle 1. If an obstruction is present, the signal $S_1$ depicting the obstruction situation behind the motor vehicle 1 is transmitted by the detector 3 without wires to the acoustic warning device and/or to the visual warning apparatus in the information provider 2 to make the driver aware of the obstruction. Therefore, the present invention greatly reduces chances for an accident while driving in reverse, as, for instance, running into a parked motor vehicle or the like.

In accordance with another aspect of the invention—in addition to wirelessly transmitting signals $S_1$ depicting a situation behind the motor vehicle 1—signals $S_2$ may be carried without wiring from the detector 3 to the information provider 2, or from the information provider to the detector 3.

The signals $S_2$ can be, for example, signals which are sent manually and/or automatically for the programming of the detector 3 from the information provider 2 to the detector 3. As an example, the signal $S_2$ can be a control signal for the adjustment of a targeting position of a video camera 3a. The signal $S_2$ can be produced either by the driver manually or by automatic methods. An automatic initiation can occur, for example, where the radar sensor equipment, the ultrasonic apparatus and/or the infrared sensor device transmits the signal $S_1$ to the information provider 2 automatically. In response, the provider 2 will evoke the signal $S_2$ to adjust the video camera 3 a via the control device 3b. Thus, the camera 3a swings to a position in which the radar sensor apparatus, the ultrasonic sensor device, and/or the infrared apparatus has detected an obstruction. This action also optically informs the driver, for instance by the display device 2 of the kind of an obstruction.

The non-wired transmission of the signals $S_{1,2}$ between the information provider 2 and the detector 3 can be carried in analog or digital format, for example, by radio, satellite or the like. An analog transmission is sufficient in a case where few disturbances from other radio systems are to be expected. In a case in which a greater disturbance protection is necessary, then a digital transmission is advantageous. For example, the standards DECT, Bluetooth™ or other appropriate procedures or standards can be used. Usually, the selected transmission system should be bi-directional.

In order to assure a clear association between the information provider 2 and the detector 3, an assured arrangement of the two apparatuses is carried out by a recognition signal $S_3$, which signals that these two apparatuses 2, 3 are simultaneously available. For instance, a signal $S_3$ of reverse driving, occurring upon shifting to a reverse gear, is transmitted to the detector 3 from a backup light (not shown) of the motor vehicle 1. Again, no wiring is required from the information provider 2 to the detector 3. Additionally, it is possible in one aspect of the invention to provide the necessary recognition association between provider 2 and detector 3 via a starting signal $S_3$ from an ignition of the motor vehicle 1. This signal $S_3$ would be transmitted to the detector 3 upon ignition of the motor vehicle 1 by a component (not shown), which, after the ignition of the motor vehicle 1, is wirelessly supplied with electrical energy. Stated alternatively, once again, no wiring is necessary to establish a communication from the information provider 2 to the detector 3 and vice versa.

It will be apparent to those skilled in the art that various modifications and variations can be made in the present invention without departing from the scope and spirit of the invention. For example, specific shapes, quantities and installation points of the illustrated embodiments may be altered to suit particular vehicles or other environments or applications, such as marine applications. It is intended that the present invention include such modifications and variations as come within the scope of the appended claims and their equivalents.

What is claimed is:

1. A maneuvering aid for a driver of a vehicle, the maneuvering aid comprising:
    a detector affixable to the vehicle, the detector configured to monitor an area about the vehicle and generate a signal responsive to an object located in the monitored area;
    an information provider disposed in the vehicle apart from the detector in wireless communication with the detector, the detector configured to wirelessly transmit the signal to the information provider, the information provider configured to communicate the signal to the driver; wherein,
    the information provider is configured to automatically control a first part of the detector, the controlled first part configured to automatically adjust a second part of the detector to monitor the detected object.

2. The maneuvering aid of claim 1, wherein the detector is portable and removably affixed to the vehicle.

3. The maneuvering aid of claim 2, wherein the detector is removably affixed to a rear of the vehicle.

4. The maneuvering aid of claim 1, wherein the detector is a sensor apparatus and a control apparatus, the control apparatus configured to adjust the sensor apparatus to detect the object.

5. The maneuvering aid of claim 4, wherein the sensor apparatus is selected from the group consisting of an image sensor, a radar apparatus, an ultrasonic device, an infrared device, and combinations thereof.

6. The maneuvering aid of claim 5, wherein the image sensor is a video camera.

7. The maneuvering aid of claim 1, wherein the signal is communicated by the information provider to the driver visually.

8. The maneuvering aid of claim 7, wherein the signal is communicated as an image.

9. The maneuvering aid of claim 1, wherein the signal is communicated by the information provider to the driver acoustically.

10. The maneuvering aid of claim 9, wherein the signal is communicated as a verbal warning.

11. The maneuvering aid of claim 1, wherein the information provider is an image display apparatus configured for displaying to the driver a visual image corresponding to the object.

12. The maneuvering aid of claim 11, wherein the image display apparatus is integrated in a rearview mirror of the vehicle.

13. The maneuvering aid of claim 11, wherein the image display apparatus is integrated proximate the driver.

14. The maneuvering aid of claim 1, wherein the vehicle is a cab and a trailer releasably connected to the cab, the information provider disposed about the cab, the detector releasably disposed about the trailer such that the detector can be removed to a replacement trailer for further wireless communications with the information provider when the trailer is replaced by the replacement trailer.

15. The maneuvering aid of claim 1, wherein the information provider is in radio communication with the detector.

16. The maneuvering aid of claim 1, wherein the information provider is in analog communication with the detector.

17. The maneuvering aid of claim 1, wherein the information provider is digitally interfaced with the detector.

18. The maneuvering aid of claim 17, wherein the digitally interfaced information provider and detector are in cordless telecommunication.

19. The maneuvering aid of claim 1, further comprising a recognition signal configured to establish synchronous communication between the information provider and the detector.

20. The maneuvering aid of claim 19, wherein the recognition signal is wirelessly transmitted between the information provider and the detector when the vehicle is driven in reverse.

21. The maneuvering aid of claim 20, wherein an activated reverse light of the vehicle transmits a reverse signal to the detector, the detector configured to initiate the recognition signal to the information provider.

22. The maneuvering aid of claim 19, wherein the recognition signal is transmitted between the information provider and the detector when the vehicle is started.

23. The maneuvering aid of claim 22, wherein a starter of the vehicle transmits an ignition signal to the detector, the detector configured to initiate the recognition signal to the information provider.

24. The maneuvering aid of claim 22, wherein an electronic component senses an ignition signal, the electronic component configured to transmit the ignition signal to one of the detector and the information provider to synchronize recognition between the detector and the information provider.

25. The maneuvering aid of claim 1, wherein the information provider is configured to control the detector.

26. The maneuvering aid of claim 25, wherein the information provider is configured to be manually programmed by the driver to control of the detector.

27. A parking aid for a vehicle comprising:
    a detector releasably attached to the vehicle, the detector having a sensor and a control apparatus, the sensor configured to monitor an area about the vehicle, the control apparatus configured to adjust a field of view of the sensor such that the sensor detects an object in the area proximate the vehicle; and
    an information provider in synchronous, two-way communication with the detector, the information provider disposed in the vehicle and configured to wirelessly receive a signal of the detected object from the sensor and communicate the signal to a driver of the vehicle.

28. The parking aid of claim 27, wherein the sensor is an imaging sensor.

29. The parking aid of claim 27 wherein the sensor is a radar.

30. The parking aid of claim 27, wherein the sensor is an ultrasonic apparatus.

31. The parking aid of claim 27, wherein the information provider is a visual display device, the visual display device disposed in a field of regard of the driver.

32. The parking aid of claim 31, wherein the visual display device further comprises a programmable portion, the programmable portion configured to send commands to the control apparatus to adjust the sensor.

33. The parking aid of claim 27, wherein the detector and the information provider are cordlessly portable.

34. The parking aid of claim 27, wherein the detector and the information provider are synchronized by an electronic event about the vehicle.

35. The parking aid of claim 34, wherein the information provider automatically controls the detector subsequent to the electronic event.

36. The parking aid of claim 34, wherein the electronic event is transmitted by two-way radio.

37. The parking aid of claim 34, wherein the electronic event is an ignition of the vehicle.

38. The parking aid of claim 34, wherein the electronic event is an energization of a vehicle light.

39. The parking aid of claim 38, wherein the vehicle light is selected from the group consisting of a headlight, a reverse light, and combinations thereof.

40. The parking aid of claim 27, wherein the sensor is a plurality of sensors.

41. A parking aid for a vehicle comprising:
 a portable sensor and control apparatus releasably attached to the vehicle, a control portion configured to control a sensor portion of the portable sensor and control apparatus to monitor an area proximate the vehicle; and
 an alert system located about the vehicle apart from the portable sensor and control apparatus, the alert system disposed in a field of view of a driver of the vehicle and configured to wirelessly receive a signal of a detected object from the sensor portion, the alert system configured to alert the driver of the detected object and automatically wirelessly adjust the sensor portion via the control portion to further monitor the detected object.

42. The parking aid of claim 41, wherein the alert system is configured to be manually controlled by the driver.

43. The parking aid of claim 41, wherein the portable sensor and control apparatus and the alert system are synchronized on a wireless communication circuit upon occurrence of an electronic vehicle event.

44. The parking aid of claim 43, wherein the electronic vehicle event is selected from the group consisting of an ignition, an energization of a vehicle light, a gear change, and combinations thereof.

* * * * *